US008567517B2

(12) United States Patent
Friggstad et al.

(10) Patent No.: US 8,567,517 B2
(45) Date of Patent: Oct. 29, 2013

(54) AGRICULTURAL IMPLEMENT TOOL FRAME ACTUATING SYSTEM

(75) Inventors: Terrance A. Friggstad, Grasswood (CA); Nicholas George Alfred Ryder, Saskatoon (CA); Cory Adrian Yuen, Martensville (CA)

(73) Assignee: CNH Canada, Ltd. (CA)

( * ) Notice: Subject to any disclaimer, the term of this patent is extended or adjusted under 35 U.S.C. 154(b) by 165 days.

(21) Appl. No.: 12/783,655

(22) Filed: May 20, 2010

(65) Prior Publication Data

US 2011/0284252 A1 Nov. 24, 2011

(51) Int. Cl.
*A01B 5/00* (2006.01)

(52) U.S. Cl.
USPC ............................ 172/140; 172/460; 172/488

(58) Field of Classification Search
USPC ......... 172/140, 159, 311, 314, 440, 452, 456, 172/458, 460, 462, 468, 471, 472, 488
See application file for complete search history.

(56) References Cited

U.S. PATENT DOCUMENTS

| | | | | |
|---|---|---|---|---|
| 2,595,461 | A | 5/1952 | James | |
| 2,605,686 | A | 8/1952 | Starr | |
| 2,715,286 | A | 8/1955 | Saveson | |
| 2,918,979 | A | 12/1959 | Graham | |
| 2,958,383 | A | 11/1960 | Danielson | |
| 3,752,092 | A * | 8/1973 | Vinyard | 111/123 |
| 4,158,391 | A * | 6/1979 | Clements | 172/22 |
| 4,519,460 | A * | 5/1985 | Gust | 172/176 |
| 4,763,915 | A * | 8/1988 | Risser | 280/413 |
| 4,821,806 | A | 4/1989 | Winter | |
| 4,867,247 | A * | 9/1989 | Heckendorf | 172/573 |
| 5,042,589 | A | 8/1991 | Hundeby et al. | |
| 5,234,060 | A * | 8/1993 | Carter | 172/413 |
| 5,669,452 | A * | 9/1997 | Wright et al. | 172/685 |
| 5,868,207 | A * | 2/1999 | Langbakk et al. | 172/274 |
| 6,305,478 | B1 | 10/2001 | Friggstad | |
| 6,378,619 | B2 * | 4/2002 | Mayerle et al. | 172/2 |
| 6,698,523 | B2 | 3/2004 | Barber | |
| 7,478,682 | B1 * | 1/2009 | Keigley | 172/145 |
| 7,581,597 | B2 * | 9/2009 | Neudorf et al. | 172/311 |
| 2007/0163791 | A1 * | 7/2007 | Meek | 172/311 |
| 2008/0093093 | A1 * | 4/2008 | Sheppard et al. | 172/2 |
| 2010/0025056 | A1 * | 2/2010 | Friggstad | 172/452 |

FOREIGN PATENT DOCUMENTS

| | | |
|---|---|---|
| EP | 0219515 | 4/1987 |
| EP | 1454518 | 9/2004 |

* cited by examiner

*Primary Examiner* — Jamie L McGowan
(74) *Attorney, Agent, or Firm* — Rebecca Henkel

(57) ABSTRACT

In an embodiment, an agricultural implement includes a tool bar and a tool frame rotatably coupled to the tool bar. The agricultural implement also includes multiple row units coupled to the tool frame, and a frame actuator extending between the tool bar and the tool frame. The frame actuator is configured to rotate the tool frame between a lowered position that places each row unit in contact with soil and a transport position that raises each row unit above the soil. The frame actuator is also configured to transfer weight from the tool bar to the tool frame while the tool frame is in the lowered position. Each row unit includes a ground engaging tool configured to selectively engage and disengage the soil while the tool frame is in the lowered position.

14 Claims, 5 Drawing Sheets

AGRICULTURAL IMPLEMENT TOOL FRAME ACTUATING SYSTEM

BACKGROUND

The invention relates generally to a system for actuating a tool frame on an agricultural implement, and more specifically, to a frame actuator configured to transfer weight from a tool bar to the tool frame while the tool frame is in a lowered position, and to raise the tool frame into a transport position.

A range of agricultural implements have been developed and are presently in use for tilling, planting, harvesting, and so forth. Seeders, for example, are commonly towed behind tractors and may cover wide swaths of ground which may be tilled or untilled. Such devices typically open the soil, dispense seeds in the soil opening, and re-close the soil in a single operation. In seeders, seeds are commonly dispensed from bulk seed tanks and distributed to row units by a distribution system. To make the planting operation as efficient as possible, very wide swaths of ground may be covered by extending wings on either side of a central boom section of the implement. Included in the wing assemblies are generally tool bars, tool frames, row units, and support wheels. In certain configurations, the tool frames may rotate relative to the tool bars such that the tool frames remain substantially parallel to the soil despite variations in soil elevation. Unfortunately, a draft force associated with pulling the row units through the soil may induce a torque that drives the tool frames to rotate upwardly. The upward rotation of the tool frames may reduce a penetration depth of ground engaging tools of the row units, resulting in undesirable seed deposition depths.

BRIEF DESCRIPTION

Embodiments of the present disclosure include a frame actuator configured to transfer weight from a tool bar to a tool frame while the tool frame is in a lowered position, and to raise the tool frame into a transport position. In one embodiment, an agricultural implement includes a tool bar and a tool frame rotatably coupled to the tool bar. The agricultural implement also includes multiple row units coupled to the tool frame, and a frame actuator extending between the tool bar and the tool frame. The frame actuator is configured to rotate the tool frame between a lowered position that places each row unit in contact with soil and a transport position that raises each row unit above the soil. The frame actuator is also configured to transfer weight from the tool bar to the tool frame while the tool frame is in the lowered position. Each row unit includes a ground engaging tool configured to selectively engage and disengage the soil while the tool frame is in the lowered position. Transferring weight from the tool bar to the tool frame urges the row units against the soil despite variations in soil elevation and/or torque induced by a draft force acting on the ground engaging tools. Consequently, the ground engaging tools may maintain a desired penetration depth into the soil during seeding and/or planting operations.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
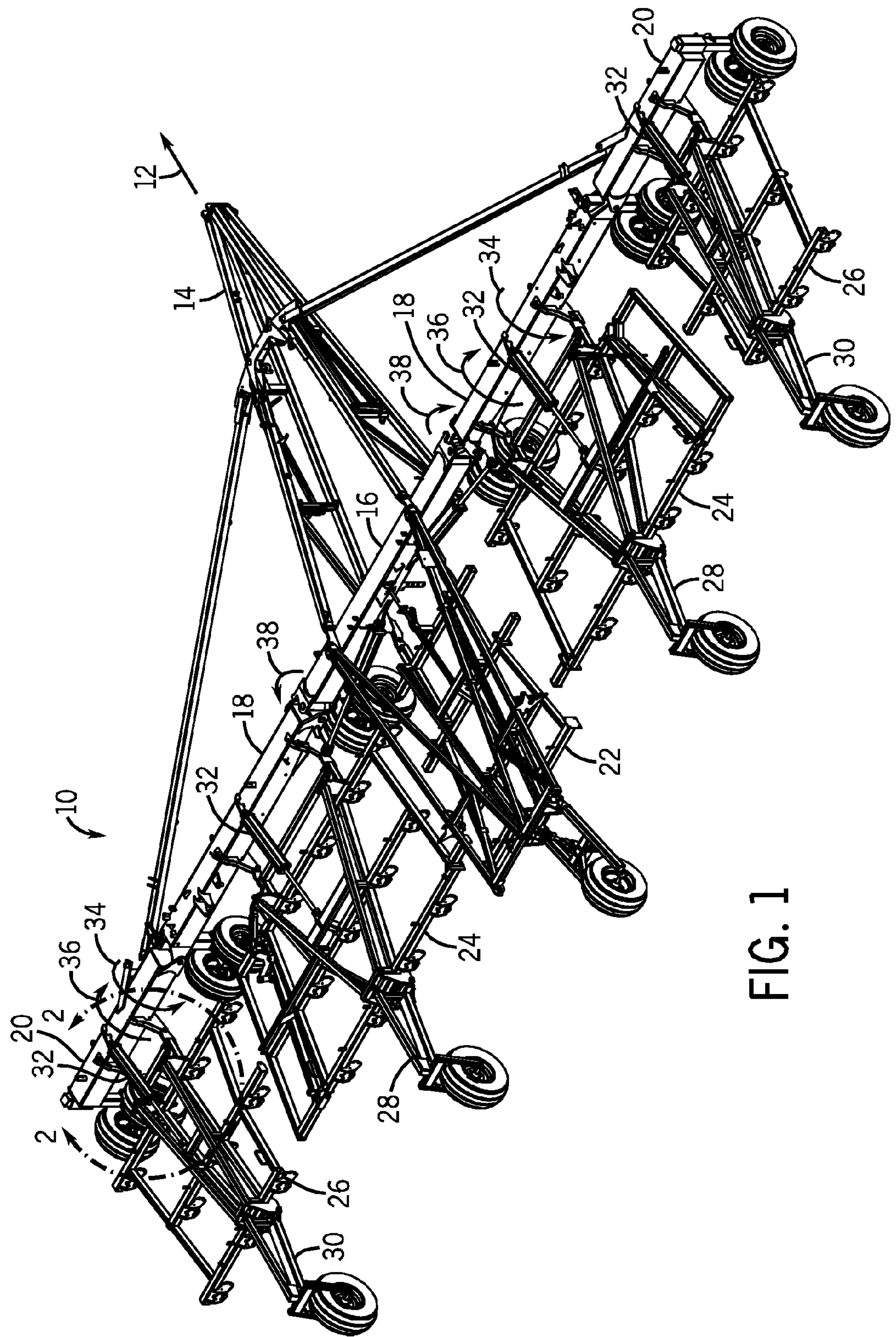
FIG. 1 is a perspective view of a folding agricultural implement in a working position.

Turning now to the figures, FIG. 1 is a perspective view of a folding implement 10 in a working position. The implement 10 is designed to be towed behind a work vehicle such as a tractor along a direction of travel 12. The implement 10 includes a tow bar assembly 14 which is shown in the form of an A-frame hitch assembly. The tow bar assembly 14 may include a hitch used to attach to an appropriate tractor hitch via a ball, clevis, or other coupling. The tow bar assembly 14 is coupled to a central tool bar 16, and two first wing tool bars 18 are each coupled to an end of the central tool bar 16. In addition, a second wing tool bar 20 is coupled to each first wing tool bar 18. As illustrated, both the first wing tool bars 18 and the second wing tool bars 20 are substantially aligned with the longitudinal axis of the central tool bar 16. In other words, each tool bar 16, 18 and 20 is positioned perpendicular to the tow bar assembly 14. In alternative embodiments, the central tool bar 16 may be omitted, and the first wing tool bars 18 may be coupled directly to the tow bar assembly 14. As discussed in detail below, both the first wing tool bars 18 and the second wing tool bars 20 may be rotated rearwardly or forwardly for transport.

In the present embodiment, a central tool frame 22 is coupled to the central tool bar 16, first wing tool frames 24 are coupled to respective first wing tool bars 18, and second wing tool frames 26 are coupled to respective second wing tool bars 20. As discussed in detail below, row units are coupled to each of the tool frames 22, 24 and 26 for depositing seeds and/or fertilizer into the soil. In the illustrated working position, each first wing tool frame 24 is supported by a wheel assembly 28, and each second wing tool frame 26 is supported by a wheel assembly 30. In this configuration, towing the implement 10 in the direction 12 enables the row units to engage the soil, thereby depositing seeds and/or fertilizer into the soil. In addition, a frame actuator 32 extends from each tool frame 24 and 26 to a respective tool bar 18 and 20 to transfer weight from the tool bars 18 and 20 to the tool frames 24 and 26. The frame actuators 32 also serve to raise the tool frames 24 and 26 into a transport position. While each tool bar of the illustrated embodiment includes a single tool frame, it should be appreciated that alternative embodiments may include multiple (e.g., 2, 3, 4, etc.) tool frames per tool bar.

As discussed in detail below, certain row units include a ground engaging tool and a tool actuator configured to vary a penetration depth of the ground engaging tool in the soil. For example, the tool actuator may transition the ground engaging tool between a working position and a non-working position. In the working position, the ground engaging tool opens a trench within the soil for seed deposition. In the non-working position, the ground engaging tool is extracted from the soil to reduce a draft force on the implement 10. For example, with the tool frames 24 and 26 in the illustrated lowered position, the ground engaging tools may be transitioned to the working position to excavate a trench into the soil for seed deposition. However, when the implement 10 reaches a headland, the tool actuators may transition each ground engaging tool into the non-working position, thereby removing the ground engaging tools from the soil. In this manner, the implement may be turned at the headland without creating undesired trenches. After the implement is aligned with a subsequent row, the tool actuators will transition the ground engaging tools to the working position for continued planting or seeding operations.

In the present embodiment, the tool frames 24 and 26 are rotatably coupled to the respective tool bars 18 and 20 such that the tool frames 24 and 26 may rotate in a downward direction 34 and/or an upward direction 36 relative to the tool bars 18 and 20. In this manner, the tool frames 24 and 26 may remain substantially parallel to the soil despite variations in soil elevation. However, as discussed in detail below, a draft force associated with pulling the ground engaging tools through the soil may induce the tool frames 24 and 26 to rotate in the upward direction 36. Consequently, the frame actuators 32 may urge the tool frames 24 and 26 in the downward direction 34, thereby transferring weight from the tool bars 18 and 20 to the tool frames 24 and 26. As a result, sufficient down force may be applied to the row units to counteract the upward rotation induced by the draft force, thereby maintaining contact between the row units and the soil surface. In addition, the frame actuators 32 are configured to rotate the tool frames 24 and 26 in the upward direction 36, thereby raising the tool frames 24 and 26 for transport.

In the present embodiment, the implement 10 is configured to transition from the illustrated working mode to a transport mode by folding the first and second wing tool bars 18 and 20 rearwardly in a direction 38 or forwardly, and folding the first and second wing tool frames 24 and 26 upwardly in the direction 36. Specifically, the first wing tool frames 24 and the second wing tool frames 26 may be folded approximately 90 degrees upwardly in the direction 36 from a lowered position to a transport position. Next, the first wing tool bars 18 and the second wing tool bars 20 may be folded approximately 90 degrees rearwardly in the direction 38. In alternative embodiments, tool bars 18 and 20 may be folded approximately 90 degrees forwardly. As discussed in detail below, the implement will have a significantly smaller profile in the transport position.

Figure 2:
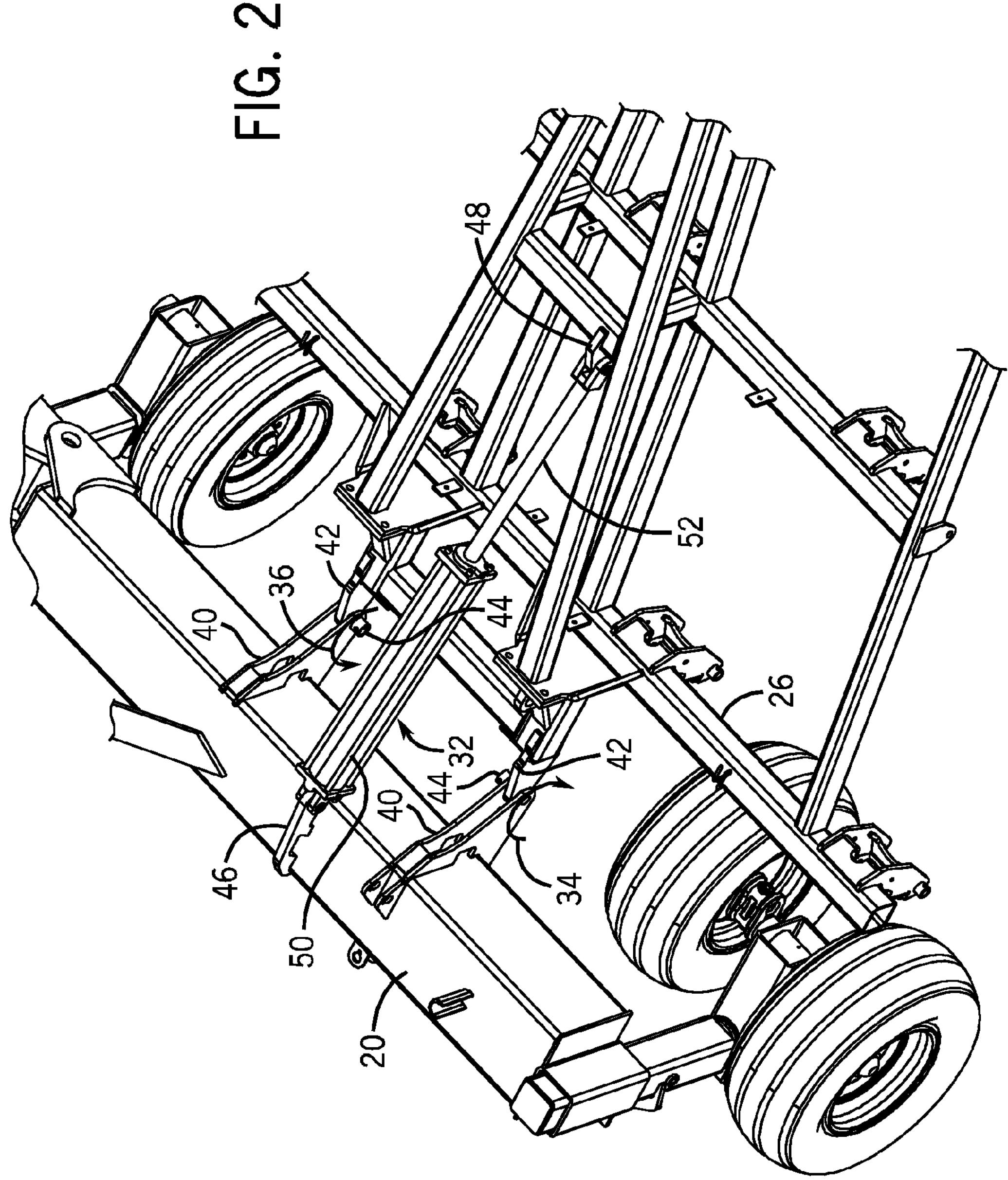
FIG. 2 is a detail of the perspective view of the folding agricultural implement shown in FIG. 1, taken within line 2-2.

FIG. 2 is a detail of the perspective view of the folding agricultural implement shown in FIG. 1, taken within line 2-2. As previously discussed, the tool frame 26 is rotatably coupled to the tool bar 20 such that the tool frame 26 may adjust to the contours of the terrain, and transition to the transport position. The present embodiment includes a first bracket 40 coupled to the tool bar 20, a second bracket 42 coupled to the tool frame 26 and a pin 44 rotatably coupling the first bracket 40 to the second bracket 42. In this configuration, the tool frame 26 may rotate about the pin 44 in the downward direction 34 and/or the upward direction 36. As illustrated, two first brackets 40, two second brackets 42 and two pins 44 are employed to rotatably couple the tool frame 26 to the tool bar 20. However, it should be appreciated that alternative embodiments may employ more or fewer first brackets 40, second brackets 42 and pins 44. For example, certain embodiments may include 1, 2, 3, 4, 5, 6, or more sets of brackets 40 and 42, and pins 44.

In the present embodiment, the frame actuator 32 includes a linear actuating cylinder. As will be appreciated, the linear actuating cylinder may be driven by hydraulic or pneumatic pressure from a fluid supply system. However, it should be appreciated that alternative embodiments may employ an electrically operated linear actuator and/or an electric, hydraulic or pneumatic rotary actuator to facilitate rotation of the tool frame 26 with respect to the tool bar 20. In the present embodiment, the actuating cylinder 32 is coupled to the tool bar 20 by a first bracket 46, and coupled to the tool frame 26 by a second bracket 48. In this manner, extension or retraction of a piston rod 52 with respect to a barrel 50 will drive the tool frame 26 to rotate in the downward direction 34 or the upward direction 36. While the rotational coupling and frame actuator 32 have been described above with reference to the second wing tool bar 20 and second wing tool frame 26, it should be appreciated that a similar arrangement may be employed for the first wing tool bar 18 and the first wing tool frame 24.

As discussed in detail below, while the tool frame 26 is in the illustrated lowered position, the frame actuator 32 is configured to provide a first torque in the downward direction 34, thereby urging the row units against the soil. In this manner, packer wheels of the row units may maintain contact with the soil despite variations in soil elevation and/or torque in the upward direction 36 induced by a draft force acting on the ground engaging tools of the row units. Consequently, the ground engaging tools may maintain a desired penetration depth into the soil during seeding and/or planting operations. In addition, the frame actuator 32 is configured to transition the tool frame 26 to the transport position by rotating the tool frame 26 in the upward direction 36, thereby lifting the ground engaging tools above the soil surface.

Figure 3:
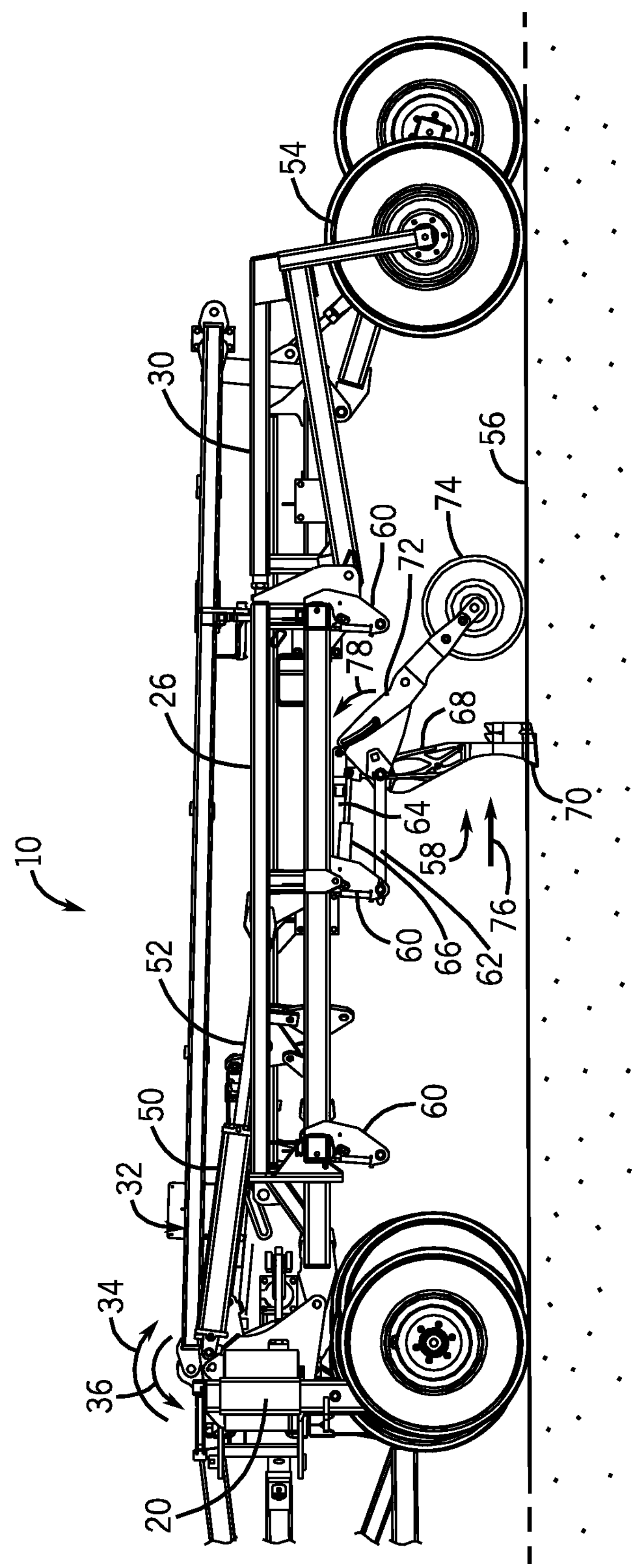
FIG. 3 is a side view of the folding agricultural implement shown in FIG. 1, illustrating a row unit in a working position.

FIG. 3 is a side view of the folding agricultural implement 10 shown in FIG. 1, illustrating a row unit in a working position. As illustrated, the wheel assembly 30 includes a wheel 54 which contacts the soil surface 56. Because the tool frame 26 may rotate in the direction 34 and/or 36, contact between the wheel 54 and the soil surface 56 may drive the tool frame 26 toward an orientation substantially parallel to the soil surface 56. Consequently, each row unit 58 may be properly positioned for seed and/or fertilizer deposition into the soil. In the present embodiment, the row units 58 are coupled to respective mounting brackets 60 on the tool frame 26. While a single row unit 58 is shown for clarity, it should be appreciated that a row unit may be coupled to each mounting bracket 60 on the frame 26. For example, in certain embodiments at least 2, 4, 6, 8, 10, 12, 14, 16, 18, 20, or more row units 58 may be coupled to each second wing tool frame 26 and/or each first wing tool frame 24.

As illustrated, the row unit 58 includes a first member 62, a second member 64, and a tool actuator such as an actuating cylinder 66 (e.g., hydraulic and/or pneumatic piston-cylinder assembly) coupled to the mounting bracket 60. The cylinder 66 may be fluidly coupled to a fluid supply system that provides a flow of pressurized fluid which displaces a piston rod extending from the cylinder. It should be appreciated that the fluid supply system may be hydraulic or pneumatic, thereby powering the hydraulic or pneumatic cylinder 66. The mounting bracket 60 is configured to interface with the tool frame 26, thereby securing the row unit 58 to the implement 10. For instance, multiple row units 58 may be mounted in parallel along the tool frame 26. In the present configuration, the first member 62, the second member 64, and the mounting bracket 60 form elements of a parallel linkage, also known as a four bar linkage. As will be appreciated, components of the row unit 58, such as the mounting bracket 60, first member 62 and second member 64, may be made of any suitable material, such as steel.

The cylinder 66 is attached to a shank 68 via a pin at the end of the piston rod. The shank, in turn, is coupled to a ground engaging tool 70 via fasteners which enable height adjustment of the ground engaging tool 70 such that seeding depth may be varied. A pin is coupled to the first member 62 and the shank 68, enabling the shank 68 to pivotally rotate about the pin as the cylinder 66 extends and retracts. Accordingly, the ground engaging tool 70 moves in a downward or upward direction based upon extension or retraction of the cylinder 66. Consequently, the tool actuator/cylinder 66 is configured to vary a penetration depth of the ground engaging tool 70 into the soil 56 independently of a distance between the tool frame 26 and the soil 56. The shank 68 may feature several holes to receive a pin coupling the end of the cylinder 66 to the shank 68. The adapter holes may be used to adjust the angle of the cylinder 66 with respect to the parallel linkage assembly, thereby changing the angle and magnitude of cylinder forces.

In the present embodiment, partially relieving pressure to a cap end of the cylinder 66 will reduce the downward force applied by a packer wheel assembly 72. In addition, applying pressure to a rod end of the cylinder 66 will raise the packer wheel assembly 72, and will eventually lift the packing wheel 74 from the terrain. As will be appreciated, the packer wheel assembly 72 is configured to establish a desired penetration depth of the ground engaging tool 70 into the soil 56. In the present embodiment, the packer wheel assembly 72 may facilitate height adjustment of the packer wheel 74, in the form of a fastener and slot or an equivalent structure. To facilitate seed deposition during operation, the ground engaging tool 70 may be coupled to a product delivery system.

As a result of this exemplary row unit configuration, the ground engaging tool 70 may be transitioned between a working position and a non-working position based on extension and retraction of the tool actuator/cylinder 66. As previously discussed, retraction of the cylinder 66 induces the ground engaging tool 70 to rotate in an upward direction, thereby extracting the ground engaging tool 70 from the soil, and transitioning the tool 70 toward the non-working position. Moving each ground engaging tool 70 into the non-working position facilitates transport of the seeding implement 10 by reducing the draft force associated with each tool 70. In addition, a flow of product (e.g., seeds, fertilizer, etc.) to the row unit 58 may be temporarily suspended when the ground engaging tools 70 are in the non-working position. Consequently, the seeding implement 10 may be moved across a field (e.g., turned at a headland) without depositing product within the soil.

Conversely, each ground engaging tool 70 may be transitioned toward the working position by extending the tool actuator/cylinder 66, thereby driving the ground engaging tool 70 to rotate in a downward direction. As will be appreciated, while the ground engaging tool 70 is in the working position, the tool 70 may excavate a trench into the soil as the implement 10 traverses the field. Once a trench has been excavated, the product delivery system may deposit seeds and/or fertilizer into the soil via a delivery tube. The packer wheel 74 may then close the trench, thereby forming a seed row suitable for crop development.

As will be appreciated, contact between the ground engaging tool 70 and the soil 56 creates a draft force in the direction 76. Due to the vertical offset between the ground engaging tool 70 and the mounting bracket 60, the draft force induces a torque in the direction 78. The induced torque 78 is transferred to the tool frame 26 via the mounting bracket 60, thereby establishing a torque in the upward direction 36. In certain embodiments, the weight of the tool frame 26 may be insufficient to overcome the torque and maintain contact between the packer wheel 74 and the soil 56. As a result, the tool frame 26 may rotate in the direction 36, thereby reducing the penetration depth of the ground engaging tool 70. Consequently, seeds and/or fertilizer may be deposited at an undesirable depth. To compensate for the draft force induced torque, the frame actuator 32 may apply a counteracting torque in the direction 34, thereby transferring weight from the tool bar 20 to the tool frame 26. The additional torque may be sufficient to hold the packer wheel 74 against the soil, thereby maintaining the desired penetration depth.

In addition, as previously discussed, the frame actuator 32 may rotate the tool frame 26 in the upward direction 36 to transition the frame from the illustrated working position to a transport position. For example, hydraulic pressure may be applied to a rod end of the barrel 50, thereby driving the piston rod 52 to retract. Because the piston rod is coupled to the tool frame 26 by the bracket 48, retraction of the piston rod 52 will urge the frame to rotate in the upward direction 36. As discussed in detail below, both the first wing tool frames 24 and second wing tool frames 26 may be rotated upwardly about their respective tool bars 18 and 20 to transition the implement 10 into the transport position.

Figure 4:
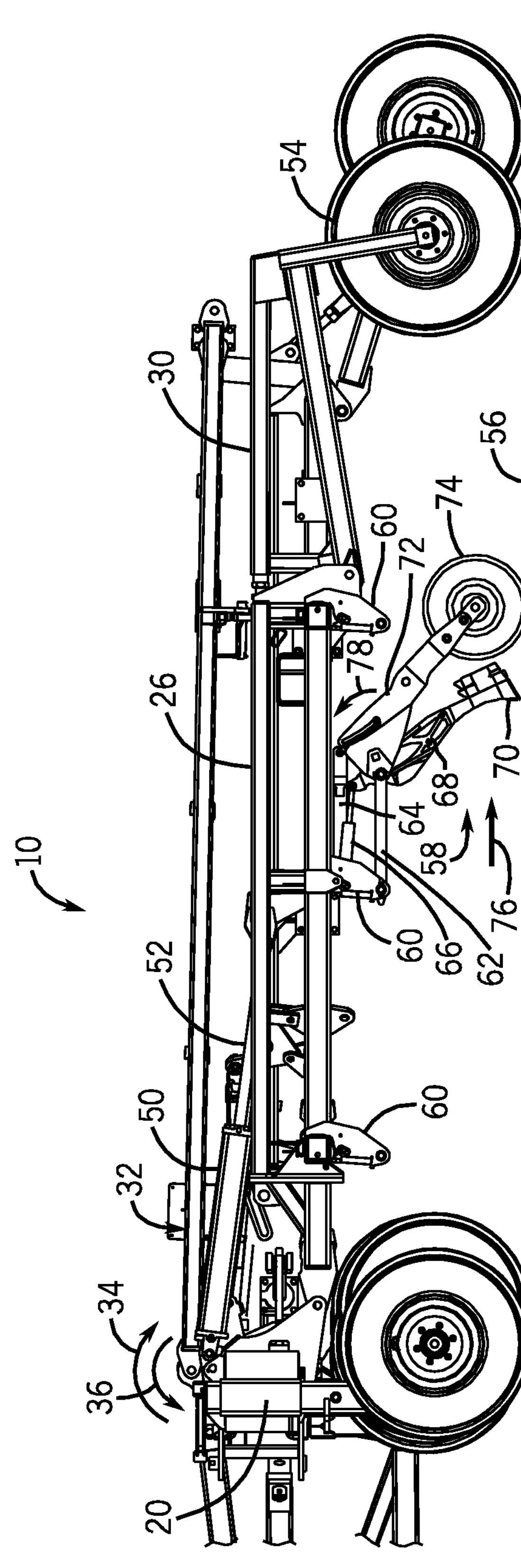
FIG. 4 is a side view of the folding agricultural implement shown in FIG. 1, illustrating a row unit in a non-working position.

FIG. 4 is a side view of the folding agricultural implement 10 shown in FIG. 1, illustrating a row unit 58 in a non-working position. As previously discussed, the ground engaging tool 70 may be rotated to the illustrated non-working position via retraction of the tool actuator/cylinder 66. For example, fluid pressure may be applied to the rod end of the cylinder 66 to raise the shank 68 and ground engaging tool 70 relative to the packer wheel assembly 72. In this manner, the ground engaging tool 70 may be extracted from the soil 56, even with the frame 26 in the lowered position. For example, when the implement 10 reaches a headland, the cylinders 66 may transition each ground engaging tool 70 into the non-working position, thereby removing the ground engaging tools 70 from the soil 56 without lifting the tool frames 24 and 26. Such a configuration enables the implement 10 to be turned at the headland without creating undesired trenches, and without transitioning the tool frames 24 and 26 to the transport position. Once seeding and/or planting operations are complete, the frame actuators 32 may retract, thereby driving the tool frames 24 and 26 to the transport position to facilitate implement movement across the field.

Figure 5:
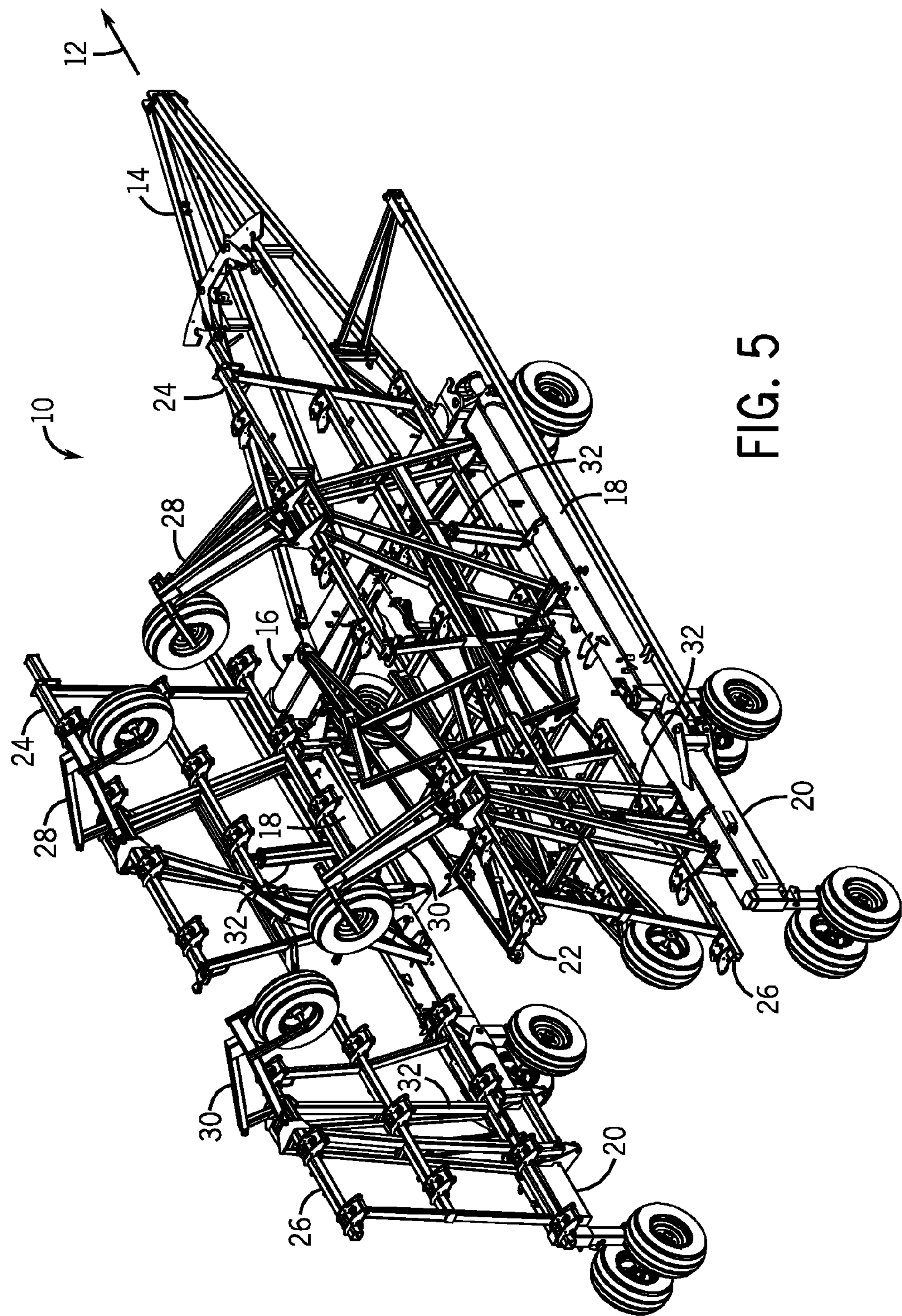
FIG. 5 is a perspective view of the folding implement, as shown in FIG. 1, in a transport position.

FIG. 5 is a perspective view of the folding implement 10, as shown in FIG. 1, in a transport position. As illustrated, the first wing tool frames 24 and the second wing tool frames 26 are rotated approximately 90 degrees upwardly from their working positions. As previously discussed, the frame actuators 32 may rotate the tool frames 24 and 26 in the upward direction 36 about the pins 44, thereby raising the row units 58 above the soil surface 56. In addition, the first wing tool bars 18 and the second wing tool bars 20 are rotated approximately 90 degrees rearwardly from their working positions. Furthermore, the wheel assemblies 28 and 30 have rotated downwardly because the load associated with the tool frames 24 and 26 is borne by the tool bars 18 and 20 in the transport mode. This configuration of the implement 10 provides a compact profile suitable for transport.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural implement, comprising:

a tool bar;

a tool frame rotatably coupled to the tool bar;

a plurality of row units coupled to the tool frame; and a frame actuator extending between the tool bar and the tool frame, wherein the frame actuator is configured to rotate the tool frame between a lowered position that places each row unit in contact with soil and a transport position that raises each row unit above the soil, the frame actuator is configured to transfer weight from the tool bar to the tool frame while the tool frame is in the lowered position, and the weight transferred from the tool bar to the tool frame by the frame actuator is sufficient to maintain contact between each row unit and the soil without an additional biasing assembly extending between the tool bar and the tool frame;

wherein each row unit comprises a ground engaging tool configured to selectively engage and disengage the soil while the tool frame is in the lowered position.

2. The agricultural implement of claim 1, wherein the frame actuator comprises a linear actuator extending between a first mounting bracket on the tool bar and a second mounting bracket on the tool frame.

3. The agricultural implement of claim 1, wherein the frame actuator comprises a hydraulic actuator.

4. The agricultural implement of claim 1, comprising a plurality of tool bars and a plurality of tool frames, wherein a frame actuator extends between each tool frame and a corresponding tool bar.

5. The agricultural implement of claim 4, wherein the plurality of tool bars comprises two first wing tool bars each having a first end and a second end, the first end being pivotally coupled to a tow bar assembly, and two second wing tool bars each coupled to the second end of a respective first wing tool bar, and wherein the plurality of tool frames comprises two first wing tool frames each coupled to a respective first wing tool bar, and two second wing tool frames each coupled to a respective second wing tool bar.

6. The agricultural implement of claim 1, wherein each row unit comprises a tool actuator coupled to the ground engaging tool and configured to transition the ground engaging tool between a working position in which the ground engaging tool engages the soil and a non-working position in which the ground engaging tool disengages the soil, while the tool frame is in the lowered position.

7. The agricultural implement of claim 1, wherein each row unit comprises a packer wheel configured to establish a penetration depth of the ground engaging tool into the soil, and wherein the frame actuator is configured to position the tool frame such that each packer wheel contacts the soil while the tool frame is in the lowered position.

8. The agricultural implement of claim 1, comprising a hitch assembly coupled to the tool bar, wherein the agricultural implement is configured to be towed by the hitch assembly.

9. An agricultural implement, comprising:

a tool bar;

a tool frame coupled to the tool bar;

a plurality of row units coupled to the tool frame; and a frame actuator extending between the tool bar and the tool frame, wherein the frame actuator is configured to transition the tool frame between a lowered position that places each row unit in contact with soil and a transport position that raises each row unit above the soil, the frame actuator is configured to transfer weight from the tool bar to the tool frame while the tool frame is in the lowered position, and the weight transferred from the tool bar to the tool frame by the frame actuator is sufficient to maintain contact between each row unit and the soil without an additional biasing assembly extending between the tool bar and the tool frame;

wherein each row unit comprises a ground engaging tool and a tool actuating cylinder configured to transition the ground engaging tool between a ground-engaged working position and a ground-disengaged non-working position, while the tool frame is in the lowered position.

10. The agricultural implement of claim 9, wherein the frame actuator comprises a hydraulic cylinder.

11. The agricultural implement of claim 9, wherein the frame actuator is configured to transition the tool frame between the lowered position and the transport position by rotating the tool frame upwardly with respect to the tool bar.

12. The agricultural implement of claim 9, wherein each row unit comprises a packer wheel configured to establish a penetration depth of the ground engaging tool into the soil, and wherein the frame actuator is configured to position the tool frame such that each packer wheel contacts the soil while the tool frame is in the lowered position.

13. The agricultural implement of claim 9, comprising a plurality of tool bars and a plurality of tool frames, wherein a frame actuator extends between each tool frame and a corresponding tool bar.

14. The agricultural implement of claim 9, comprising a hitch assembly coupled to the tool bar, wherein the agricultural implement is configured to be towed by the hitch assembly.

* * * * *